(12) United States Patent
Hansen

(10) Patent No.: US 9,581,286 B2
(45) Date of Patent: Feb. 28, 2017

(54) TABLET COMPUTER HOLDING DEVICE

(71) Applicant: Allan R. Hansen, River Falls, WI (US)

(72) Inventor: Allan R. Hansen, River Falls, WI (US)

( * ) Notice: Subject to any disclaimer, the term of this patent is extended or adjusted under 35 U.S.C. 154(b) by 197 days.

(21) Appl. No.: 14/217,523

(22) Filed: Mar. 18, 2014

(65) Prior Publication Data

US 2014/0191523 A1    Jul. 10, 2014

Related U.S. Application Data

(60) Provisional application No. 61/907,632, filed on Nov. 22, 2013.

(51) Int. Cl.
| | |
|---|---|
| *A45F 5/00* | (2006.01) |
| *F16M 11/04* | (2006.01) |
| *F16M 13/00* | (2006.01) |
| *A45C 11/00* | (2006.01) |

(52) U.S. Cl.
CPC .......... *F16M 11/041* (2013.01); *F16M 13/00* (2013.01); *A45C 2011/003* (2013.01); *A45F 5/00* (2013.01); *A45F 2200/0525* (2013.01)

(58) Field of Classification Search
CPC .................. A45F 2200/0525; A45C 2011/003
USPC ................ 224/929, 930, 483, 242; 206/320; D14/250, 251; 361/679.56
See application file for complete search history.

(56) References Cited

U.S. PATENT DOCUMENTS

| | | | | |
|---|---|---|---|---|
| 5,360,108 A * | 11/1994 | Alagia | ................ | H01H 9/0242 206/320 |
| 5,383,091 A * | 1/1995 | Snell | ................ | H01H 13/70 150/154 |
| 5,480,115 A * | 1/1996 | Haltof | ................ | H01H 9/025 248/221.11 |
| 5,484,063 A * | 1/1996 | Cuccio | ................ | G11B 33/025 206/320 |
| 5,996,956 A * | 12/1999 | Shawver | ................ | G06F 1/1626 248/309.1 |
| D470,849 S * | 2/2003 | Bertagnole | ................ | D14/434 |
| 6,616,111 B1 * | 9/2003 | White | ................ | G06F 1/1626 206/320 |
| 6,626,362 B1 * | 9/2003 | Steiner | ................ | G06K 7/10881 235/462.45 |
| 6,726,070 B2 * | 4/2004 | Lautner | ................ | A44C 5/0007 224/221 |
| 6,892,880 B2 * | 5/2005 | Nieves | ................ | A45C 11/00 206/305 |

(Continued)

*Primary Examiner* — Justin Larson
(74) *Attorney, Agent, or Firm* — Global Intellectual Property Agency, LLC; Daniel Boudwin

(57) ABSTRACT

A tablet computer holding device having a rigid and substantially rectangular base is provided. A pair of upstanding walls extends vertically upward from the perimeter of the base and partially bound the base. The upstanding walls provide a widened area for a user to grip. The upstanding walls extend along a pair of opposing sides of the holding device and wrap around the corners thereof, such that the upstanding walls resemble a pair of opposing U-shapes. Since the upstanding walls do not extend around the entire base, inputs and buttons disposed on the sides of the tablet computer can be easily accessed. A plurality of elongated ridges is disposed about the perimeter of the holding device to facilitate grasping the holding device. One or more fasteners, such as clips, are disposed on the periphery of the base and are used to securely hold a tablet computer in place thereon.

13 Claims, 2 Drawing Sheets

(56) References Cited

U.S. PATENT DOCUMENTS

| | | | |
|---|---|---|---|
| D621,839 S * | 8/2010 | Sweet | D14/229 |
| D626,129 S * | 10/2010 | Lutz | D14/447 |
| 7,885,057 B2 * | 2/2011 | Itoh | B60R 11/02 |
| | | | 361/679.01 |
| 8,028,832 B2 * | 10/2011 | Lee | A45C 13/02 |
| | | | 150/127 |
| D650,783 S * | 12/2011 | Ausfeld | D13/107 |
| D650,784 S * | 12/2011 | Feldstein | D14/434 |
| 8,098,488 B2 * | 1/2012 | Lewandowski | G06F 1/1632 |
| | | | 361/679.41 |
| D660,306 S * | 5/2012 | Voorhees | D14/238.1 |
| D660,840 S * | 5/2012 | Chen | D14/434 |
| D668,660 S * | 10/2012 | Norfolk | D14/440 |
| 8,294,014 B2 * | 10/2012 | Voorhees | A61K 31/198 |
| | | | 84/327 |
| D678,298 S * | 3/2013 | Burridge | D14/447 |
| D679,716 S * | 4/2013 | Mo | D14/447 |
| 8,424,830 B2 | 4/2013 | Yang et al. | |
| 8,469,189 B2 * | 6/2013 | Liang | G06F 1/1656 |
| | | | 206/320 |
| 8,490,846 B1 * | 7/2013 | Wheatley | B60R 11/02 |
| | | | 224/277 |
| 8,490,937 B2 * | 7/2013 | Crain | F16M 13/02 |
| | | | 224/929 |
| D690,709 S * | 10/2013 | Clementi | D14/447 |
| D692,013 S * | 10/2013 | Crysell | D14/447 |
| 8,550,317 B2 | 10/2013 | Hyseni | |
| 8,576,563 B2 * | 11/2013 | Yang | A63H 33/006 |
| | | | 206/701 |
| 8,584,835 B2 * | 11/2013 | Still | A45C 11/00 |
| | | | 206/320 |
| D696,670 S * | 12/2013 | Schiller | D14/440 |
| 8,616,422 B2 * | 12/2013 | Adelman | A45F 5/00 |
| | | | 224/191 |
| 8,631,983 B2 * | 1/2014 | King | B60R 7/08 |
| | | | 224/483 |
| 8,636,183 B1 * | 1/2014 | Steiner | B60R 11/02 |
| | | | 224/483 |
| 8,668,123 B2 * | 3/2014 | Richmond | A45C 11/00 |
| | | | 224/312 |
| 8,706,176 B1 * | 4/2014 | Jia | H04M 1/04 |
| | | | 206/305 |
| 8,718,731 B1 * | 5/2014 | Tang | H04M 1/185 |
| | | | 206/305 |
| D709,510 S * | 7/2014 | Soare | D14/440 |
| D709,511 S * | 7/2014 | Sparks | D14/447 |
| D710,365 S * | 8/2014 | Huang | D14/447 |
| D714,295 S * | 9/2014 | Fujioka | D14/440 |
| 8,833,379 B1 * | 9/2014 | Kaplan | A45D 33/26 |
| | | | 132/287 |
| 8,851,349 B2 * | 10/2014 | Wheatley | B60R 11/02 |
| | | | 224/277 |
| 8,867,202 B2 * | 10/2014 | Williams | G06F 1/1632 |
| | | | 361/679.41 |
| D717,804 S * | 11/2014 | Budge | D14/447 |
| 8,885,338 B1 * | 11/2014 | Simpson | A45F 5/10 |
| | | | 224/929 |
| 8,910,787 B2 * | 12/2014 | Damon | 206/320 |
| 8,915,361 B2 * | 12/2014 | Rayner | G06F 1/1601 |
| | | | 206/320 |
| 8,925,721 B2 * | 1/2015 | Young | A45F 5/10 |
| | | | 206/320 |
| 8,950,638 B2 * | 2/2015 | Wangercyn, Jr. | H04B 1/385 |
| | | | 224/217 |
| D724,091 S * | 3/2015 | Gelsomini | D14/440 |
| 8,973,795 B2 * | 3/2015 | Chiu, Jr. | A45F 5/021 |
| | | | 224/218 |
| D729,220 S * | 5/2015 | Yung | D14/250 |
| D732,545 S * | 6/2015 | Apter | D14/447 |
| 9,098,239 B2 * | 8/2015 | Williams | G06F 1/1632 |
| 9,107,488 B1 * | 8/2015 | Cordes | F16M 11/041 |
| D741,845 S * | 10/2015 | Kim | D14/250 |
| 9,254,023 B2 * | 2/2016 | Su | A45C 11/00 |
| 2003/0201970 A1 * | 10/2003 | Liu | G06F 1/1626 |
| | | | 345/156 |
| 2003/0213822 A1 * | 11/2003 | Lautner | A44C 5/0007 |
| | | | 224/221 |
| 2004/0173482 A1 * | 9/2004 | Nieves | A45C 11/00 |
| | | | 206/320 |
| 2005/0072691 A1 * | 4/2005 | Schlansky | B60R 11/00 |
| | | | 206/232 |
| 2006/0196902 A1 * | 9/2006 | Chen | A45F 5/02 |
| | | | 224/197 |
| 2008/0169393 A1 * | 7/2008 | Wang | B60R 11/02 |
| | | | 248/274.1 |
| 2009/0212189 A1 * | 8/2009 | Carnevali | B25B 5/02 |
| | | | 248/346.04 |
| 2010/0116703 A1 * | 5/2010 | Elenes | A45C 11/38 |
| | | | 206/316.2 |
| 2010/0301183 A1 * | 12/2010 | Carnevali | F16B 5/0635 |
| | | | 248/346.04 |
| 2012/0075801 A1 | 3/2012 | Yang et al. | |
| 2012/0113034 A1 | 5/2012 | McDermid | |
| 2012/0224318 A1 | 9/2012 | Carleton | |
| 2012/0327593 A1 | 12/2012 | Finnegan et al. | |
| 2013/0270851 A1 * | 10/2013 | Konyha | A45F 5/00 |
| | | | 294/142 |
| 2013/0313845 A1 * | 11/2013 | Pedde | F16M 13/00 |
| | | | 294/137 |
| 2014/0001081 A1 * | 1/2014 | Rosen | B65D 85/30 |
| | | | 206/588 |
| 2014/0191523 A1 * | 7/2014 | Hansen | F16M 13/00 |
| | | | 294/165 |
| 2014/0285968 A1 * | 9/2014 | Budge | F16M 13/04 |
| | | | 361/679.56 |
| 2015/0009672 A1 * | 1/2015 | Girault | G06F 1/1632 |
| | | | 362/253 |

* cited by examiner

TABLET COMPUTER HOLDING DEVICE

CROSS REFERENCE TO RELATED APPLICATION

This application claims the benefit of U.S. Provisional Application No. 61/907,632 filed on Nov. 22, 2013, entitled "Ebook/Tablet Holder." The above identified patent application is herein incorporated by reference in its entirety to provide continuity of disclosure.

BACKGROUND OF THE INVENTION

Field of the Invention

The present invention relates to tablet computer holding devices. More specifically, the present invention describes a tablet computer holding device comprising a rigid, substantially rectangular base having fasteners thereon for securing a tablet computer on the base. A pair of upstanding walls are disposed on a portion of the perimeter of the base and extend vertically upward therefrom. Further, a plurality of elongated ridges are disposed on the perimeter of the holding device for facilitating grasping of the device.

Tablet computers and similar electronic computing devices are popular due to their portability and ease of use. Tablet computers are convenient for travel, because most tablet computers are lightweight devices having slim rectangular profiles. Tablet computers have a touch screen disposed on the upper surface of the device which requires users to hold the tablet by the edges of the device so as to avoid unintentionally contacting the touch screen. However, holding a tablet by its edges may result in a user dropping the tablet computer as result of not having a firm grip thereon. Further, users may tire of holding a tablet computer in this fashion for an extended period of time.

Protective cases for tablet computers are well known in the art, however most of these cases are concerned only with providing impact protection or scratch protection of the device. Thus, typical protective cases comprise a thin rubber or plastic frame that fits closely to the tablet computer. Such protective cases do not facilitate holding of the device, or offer an improved surface for gripping the tablet computer. Thus, traditional protective cases may protect tablet computers from ordinary wear and tear associated with frequent use, but do not provide a user with improved grasping of the device to prevent the device from being dropped.

The present invention provides a tablet computer holding device comprising a rigid, rectangular base having a pair of upstanding walls disposed about the perimeter of the base. The upstanding walls partially bound the base and provide users with a convenient gripping area for holding the device. The device further includes a plurality of elongated ridges disposed about the perimeter of the upper surface, and on the top surface of the upstanding walls. Elongated ridges are also positioned on the bottom surface of the base to provide additional gripping areas. One or more fasteners are disposed on the periphery of the upper surface of the base and are used to securely hold a tablet computer in place thereon. One or more apertures may be disposed on the base to facilitate removal of a tablet computer secured on the upper surface of the base.

Description of the Prior Art

Devices have been disclosed in the prior art that relate to tablet computer holding devices. These include devices that have been patented and published in patent application publications. These devices generally relate to tablet computer holding devices that provide handles or grips for a user to hold. The following is a list of devices deemed most relevant to the present disclosure, which are herein described for the purposes of highlighting and differentiating the unique aspects of the present invention, and further highlighting the drawbacks existing in the prior art.

One such device is U.S. Patent Application Publication No. 2012/0224318 to Carleton which discloses a flat, rigid, and base-like tablet computer holder having a pair of concave short sides, a pair of concave long sides, and lobes positioned at the corners of the device. The short sides have slots that serve as handles that a user may grip with his or her fingers and thumbs. The base has a large rectangular opening through which the tablet's screen may be viewed. The tablet computer may be held within a separate enclosure or clamshell and the top surface of the clam shell is secured to the bottom surface of the holder. Thus, Carleton does not disclose a device having a base with an upper surface on which a tablet can be secured by means of fasteners such as clips.

U.S. Patent Application Publication No. 2012/0075801 to Yang et al. discloses a handle for use with a tablet computer that is composed of a material that can be comfortably gripped by an infant. The handle comprises a base that is partially or fully disposed around the perimeter of the tablet and that is connected to the tablet by bridging pieces. The use of bridging pieces creates a space between the handle and the tablet computer, allowing a user to grasp the handle. Thus, Yang et al. does not disclose a device having a base with a pair of upstanding walls about its perimeter with elongated ridges thereon. Further, Yang et al. does not provide a device that helps to protect the tablet computer from breaking or being damaged when dropped.

U.S. Pat. No. 8,424,830 to Yang et al. discloses a holding device that can be configured in a folded or unfolded configuration. In the folded configuration, the holder is able to secure a portable electronic device, and in the unfolded configuration the holder is substantially flat. The device provides a base and supporting members such that the device allows a tablet to be held in an upright position. Thus, Yang et al. does not disclose a tablet computer holder having a rectangular base on which a tablet computer may be secured by means of one or more fasteners.

U.S. Patent Application Publication No. 2012/0327593 to Finnegan et al. discloses a device having a pair of grip portions connected by a bridge portion. The grip portions are ergonomically shaped and have grooves thereon to provide handles for holding the device. Various sized tablets can be placed on the bridge portion, and opposing edges of the tablet are secured in the notches of the grips. Thus, Finnegan et al. does not disclose a device having a plurality of elongated ridges positioned on the perimeter of the upper surface of a rectangular base for ease of gripping the holding device. Further, Finnegan et al. does not disclose a device that uses clips to secure a tablet computer thereon.

U.S. Pat. No. 8,550,317 to Hyseni discloses a gripping device for use with a portable electronic device case. The case has an opening therethrough and the gripper of the invention is placed in the opening and comprises a retainer having two opposing slots. A retractable strap passes through the slots and functions as a loop through which a user may place his or her hand or fingers. Thus, the strap allows a user to more securely hold an electronic device placed within the case. Hyseni does not disclose a device comprising a rectangular base having elongated ridges to facilitate holding the device, and instead discloses the use of a strap to assist as user in holding an electronic device.

Finally, U.S. Patent Application Publication No. 2012/0113034 to McDermid entitled "Tablet Computer Input Device" discloses a device having movable grips that are adapted to be attached to the left and right sides of a tablet computer. The grips comprise touch-sensitive regions that allow for user input to the tablet computer. The grips may have keys on the back and front side thereof and may also allow for back and forth rocking motion such that the grips can be oriented in multiple positions. Thus, McDermid discloses an input device for use with a tablet computer comprising grips on opposing sides of a tablet and a plurality of keys thereon. McDermid does not disclose a rigid base having upstanding walls that partially bound a tablet computer placed on the base.

These prior art devices have several known drawbacks. Some devices in the prior art disclose holding devices having a pair of grips on opposing sides of the tablet computer. However, such devices do not provide gripping surfaces around the perimeter of the tablet so that the tablet can be conveniently held in any orientation. Other devices in the prior art disclose tablet computer holding devices that do not include a base on which a tablet computer can be disposed. Such devices instead disclose grips attached to the sides of a tablet computer. These devices do not securely hold a tablet thereon in order to protect the tablet from breaking or being damaged when dropped, and are only intended to provide the tablet computer with an expanded gripping area.

In light of the devices disclosed in the prior art, it is submitted that the present invention substantially diverges in design elements from the prior art and consequently it is clear that there is a need in the art for an improvement to existing tablet computer holding devices. In this regard the instant invention substantially fulfills these needs.

SUMMARY OF THE INVENTION

In view of the foregoing disadvantages inherent in the known types of tablet computer holding devices now present in the prior art, the present invention provides a new tablet computer holding device wherein the same can be utilized for providing convenience for the user when holding a tablet computer for an extended period of time while reducing the risk of dropping the tablet.

It is therefore an object of the present invention to provide a new and improved tablet computer holding device that has all of the advantages of the prior art and none of the disadvantages.

It is another object of the present invention to provide a tablet computer holding device that provides a variety of gripping areas that allows a user to conveniently hold the device regardless of the tablet computer's orientation.

Another object of the present invention is to provide a tablet computer holding device that allows for easy insertion and removal of a tablet computer.

Yet another object of the present invention is to provide a tablet computer holding device that securely holds a tablet computer therein.

Still another object of the present invention is to provide a tablet computer holding device that allows cords and wires to be connected to a tablet secured within the holding device.

A final object of the present invention is to provide a tablet computer holding device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
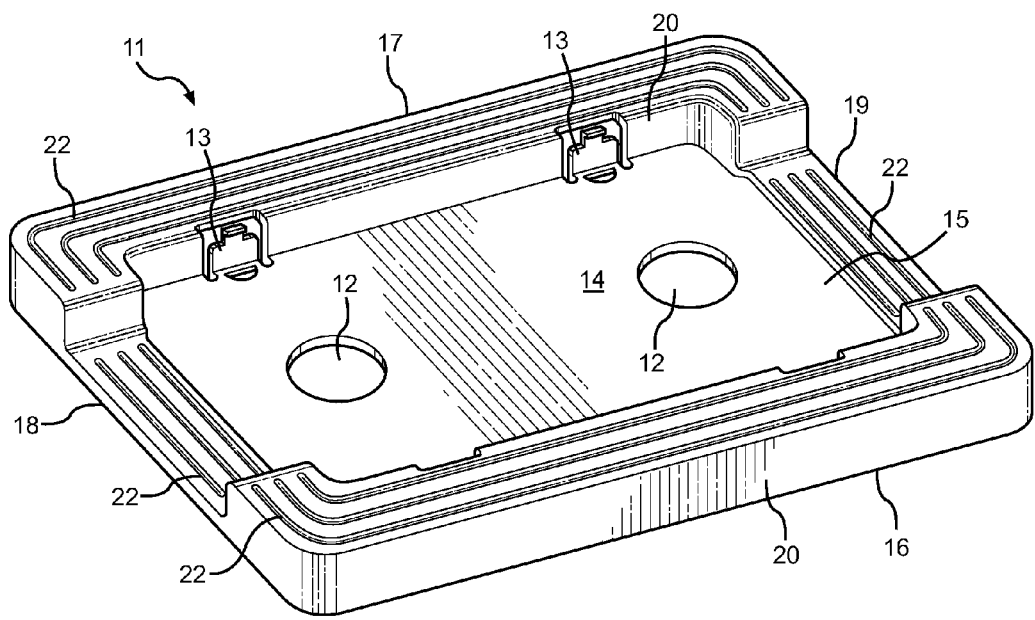
FIG. 1 shows a perspective view of the front of the tablet computer holding device of the present invention.

Reference is made herein to the attached drawings. Like reference numerals are used throughout the drawings to depict like or similar elements of the tablet computer holding device. For the purposes of presenting a brief and clear description of the present invention, the preferred embodiment will be discussed as used for holding a tablet computer while providing a user with a convenient means for gripping the tablet computer. The figures are intended for representative purposes only and should not be considered to be limiting in any respect.

Referring now to FIG. 1, there is shown a perspective view of the front of the tablet computer holding device of the present invention. The holding device 11 comprises a substantially rectangular base 15 having a perimeter and an upper surface 14 on which a tablet computer may be placed. The base 15 has a first side 16 opposite a second side 17 and a third side 18 opposite a fourth side 19. The holding device is composed of a lightweight, rigid material such as a hard-plastic. In some embodiments of the present invention, the base is composed of acrylonitrile butadiene styrene, commonly referred to as ABS. The holding device is lightweight so as to minimize the weight added to the tablet computer by the holding device. Further, the holding device is adapted to protect the tablet computer positioned within the holding device in the event the holding device is dropped onto the ground. Additionally, the holding device has a unitary, integrated construction such that no assembly of the holding device is required.

The holding device 11 comprises a pair of upstanding walls 20 disposed on the perimeter of the base 15 such that the upstanding walls 20 partially bound the base 15. The inner portion of each upstanding wall is shaped similarly to the perimeter of a tablet computer so that each upstanding wall fits closely around a tablet computer. In the embodiment shown, the upstanding walls 20 are disposed on the first side 16 and the second side 17 of the base 15 and extend around the corners of the base 15. In this way, the upstanding walls 20 resemble pair of opposing U-shaped members. The upstanding walls 20 extend around the corners of the base 15 so as to aid in proper positioning of a tablet computer within the base. If the upstanding walls consisted only of two parallel walls, the tablet computer would be able to slide along the length of the upstanding walls. Thus, in order to fix the position of a tablet computer within the holding device 11, the upstanding walls 20 wrap around the corners of the holding device 11 and extend partially along the third side 18 and fourth side 19 of the base 15 so that the upstanding walls 20 bound a tablet computer placed therein.

Figure 2:
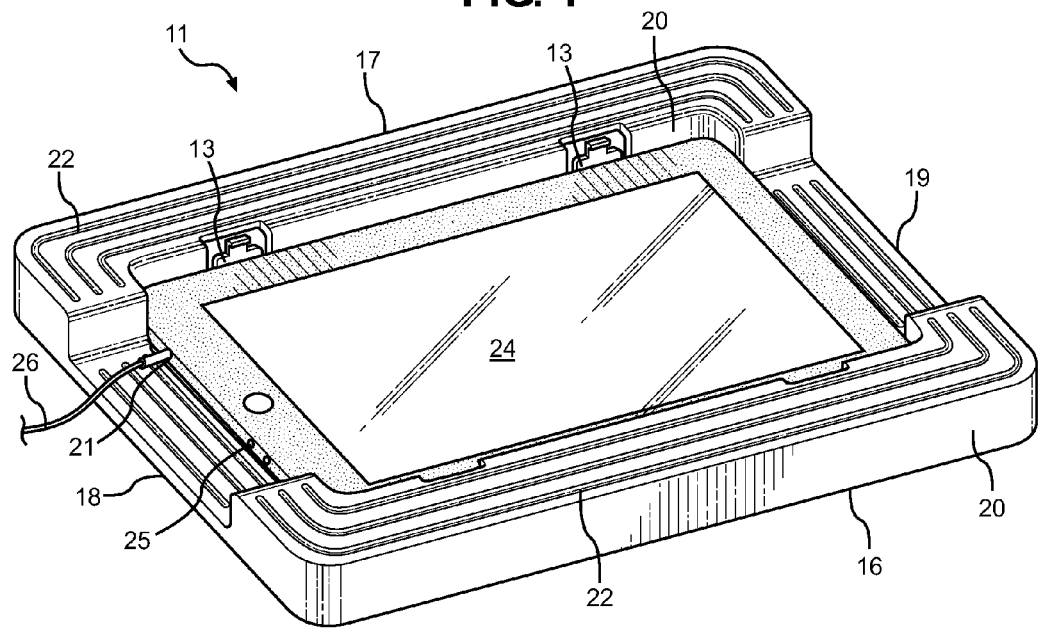
FIG. 2 shows a perspective view of the tablet computer holding device of the present invention as used to hold a tablet computer therein.

Referring now to FIG. 2, there is shown a perspective view of the tablet computer holding device of the present invention as used to hold a tablet computer therein. The third side 18 and fourth side 19 of the holding device 11 are substantially open, and do not comprise an upstanding wall on the central portions thereof. The open third and fourth sides 18, 19 allow a user to more easily insert and remove the tablet computer 24 from the holding device 11. Further, the lack of an upstanding wall along the third and fourth sides 18, 19 of the holding device 11 provides users with access to the inputs 21 and buttons 25 disposed on the sides of the tablet computer 24. In this way, power cables 26, headphones, and other cables may be plugged into the tablet computer 24 positioned on the holding device 11, and may extend out through the third and fourth sides 18, 19 of the holding device 11. If the upstanding wall was disposed around the entire perimeter of the base 15, inputs and buttons positioned on the sides of the tablet computer 24 would be inaccessible.

In addition to bounding the base of the holding device 11, the upstanding walls 20 provide a widened gripping area for users to hold, allowing a user to more easily and comfortably hold a tablet computer 24. Generally, tablets having touch screens must be grasped by the periphery of the tablet so that the user does not unintentionally interfere with the touch screen. A user may hold the holding device 11 of the present invention by grasping any of the sides of the holding device 11, and may grasp the upstanding walls 20. In some embodiments of the present invention, a plurality of elongated ridges 22 are disposed about the perimeter of the base 15. Thus, the elongated ridges 22 are disposed on the first, second, third, and fourth sides of the base 16, 17, 18, 19. Further, the elongated ridges 22 are positioned on a top surface of the upstanding walls 20. The elongated ridges 22 facilitate grasping the holding device 11 of the present invention for the comfort and convenience of the user.

Figure 3:
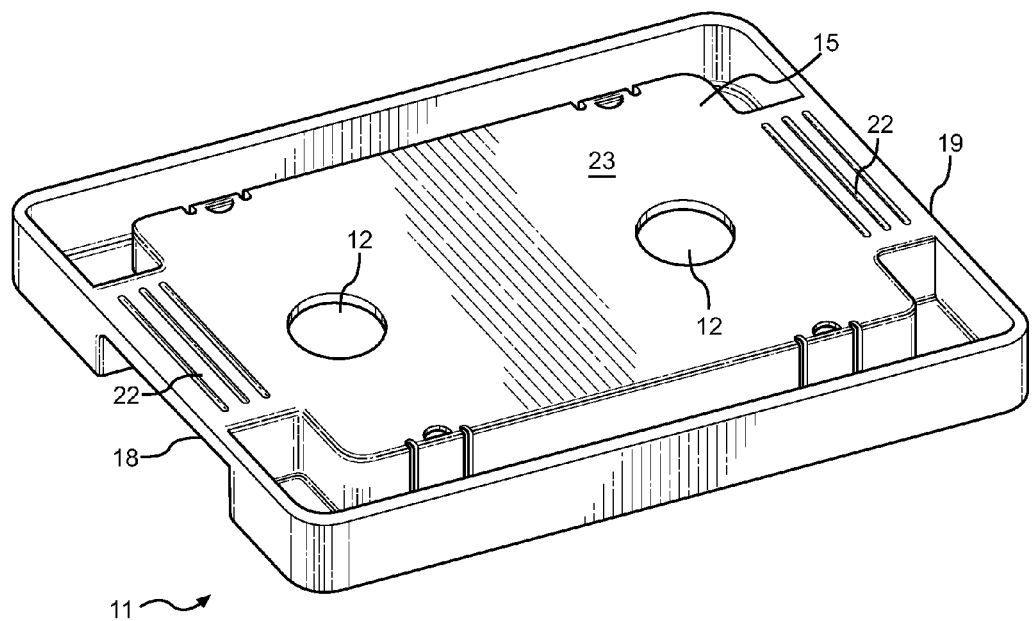
FIG. 3 shows a perspective view of the bottom surface of the tablet computer holding device of the present invention.

Referring now to FIG. 3, there is shown a perspective view of the bottom surface of the tablet computer holding device of the present invention. The holding device 11 comprises a bottom surface 23 that is substantially flat so as to allow the holding device 11 to rest against a table or other surface. In some embodiments of the present invention, the bottom surface 23 comprises grooves along the first and second sides of the base 15 that provide additional gripping areas for users. A plurality of elongated ridges 22 are positioned on opposing sides of the bottom surface 23 to facilitate grasping of the bottom surface 23 of the holding device 11. The elongated ridges 22 are arranged on the periphery or perimeter of the bottom surface 23. In a preferred embodiment of the invention, the elongated ridges 22 on the bottom surface 23 of the holding device 11 are positioned on the third and fourth sides 18, 19 of the base 15 such that the elongated ridges 22 on the third side 18 are substantially parallel to the elongated ridges 22 on the fourth side 19.

The present invention further includes one or more apertures 12 that extend through the base 15. The apertures 12 aid in removal of a tablet computer placed within the holding device 11 of the present invention. The apertures 12 are substantially circular and are sized so that a user's fingers may easily be inserted therethrough and are wide enough to ensure that a user's finger does not become stuck within the apertures 12. When a tablet computer is positioned within the holding device 11, it is held securely in place therein by one or more fasteners, such as clips. To remove the tablet computer, a user can press his or her fingers through the apertures 12 so as to lift or push the tablet computer off of the upper surface of the base 15. In operation, a user would hold the holding device 11 with the tablet computer positioned for viewing, and would push his or her fingers through the apertures 12 and press upwardly on the tablet computer so as to dislodge the tablet computer from the holding device 11. This prevents the user from having to manually disengage fasteners or clips, and also prevents the user from resorting to turning the holding device 11 upside down to remove the tablet computer therefrom.

Figure 4:
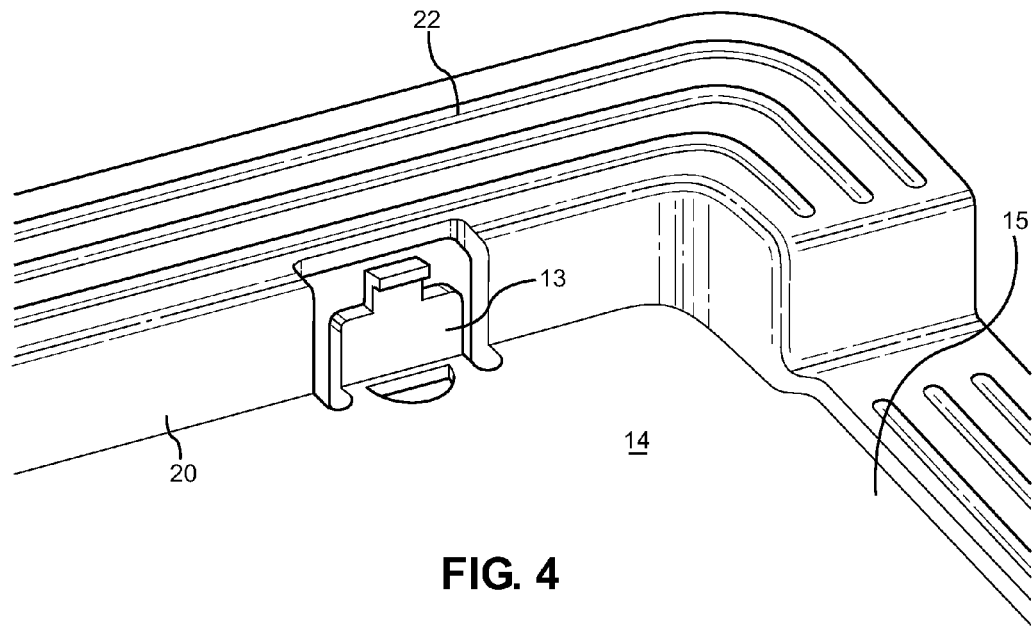
FIG. 4 shows a close-up view of a clip of the present invention disposed on the upper surface of the base.

Referring now to FIG. 4, there is shown a close-up view of a clip of the present invention disposed on the upper surface of the base. In some embodiments of the present invention, the holding device comprises clips 13 as fasteners for securing a tablet computer within the holding device. The clips 13 are positioned on the periphery or perimeter of the upper surface 14, and are used to secure a side of a tablet computer in order to hold the tablet computer within the holding device 11. The clips 13 are integrally formed with the base 15 and extend upward therefrom. In some embodiments of the present invention, the clips 13 are formed from a section of the upstanding walls 20. Where the clips are formed from a section of the upstanding walls 20, cut-outs are formed around the clips 13 that allow the clips to flex and bend. Further, the cut-outs provide ventilation and may allow sound produced by the tablet's speakers to escape the holding device without being muffled. The clips 13 are flexible and are biased towards the interior of the holding device so as to securely hold a tablet computer that is placed on the upper surface 14 of the base 15. In this way, the clips 13 are able to hold a tablet computer in place without any additional action by the user to secure or lock the clips 13 into position. The clips 13 include a flange at an upper end thereof that extends over the surface of the tablet computer so as to help secure the tablet computer in place. In a preferred embodiment of the present invention, a first pair of clips are positioned on a first side of the base and a second pair of clips are positioned on a second side of the base, opposite the first side.

Tablet computers continue to grow in popularity due to their light weight, portability, and ease of use. However, the small profile of tablet computers and the large touch-screens thereon require users to hold tablet computers by the edges or periphery of the device. Thus, many users may find it difficult to grip the tablet in this manner, and it may be uncomfortable to do so for an extended period of time. Further, the smooth surfaces of the tablet computer and small gripping area creates the risk that the user will drop the tablet computer, causing damage to the tablet computer. Thus, a device is desired that provides a protective holder for a tablet computer while providing a convenient gripping surface for comfortably grasping the device.

The present invention provides a tablet computer holding device comprising a rigid, rectangular base having an upper surface adapted to receive a tablet computer thereon. A pair of upstanding walls are disposed on the perimeter of the base and partially bound the upper surface. The upstanding walls extend along opposing sides of the holding device, and wrap around the corners of the holding device. One or more fasteners, such as clips, are disposed on the base and are adapted to hold a tablet computer placed therein. Further, a plurality of elongated ridges are positioned on the perimeter of the base, on the top surface of the upstanding walls, and on the bottom surface of the device. The elongated ridges facilitate grasping of the holding device for the convenience of the user. In this way, the present invention provides a holding device for securely holding a tablet computer therein that provides convenient gripping surfaces around the tablet computer.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tablet computer holding device, comprising:
    a rigid base having a perimeter and an upper surface, said rigid base having a substantially rectangular shape;
    a first upstanding wall and a second upstanding wall each having a top surface, said upstanding walls extending vertically upward from the perimeter of said base and partially bounding said upper surface of said base;
    one or more fasteners disposed on said upper surface of said base, said one or more fasteners adapted to secure a side of a tablet computer disposed on said upper surface of said base;
    said rigid base further comprising a first side opposite a second side and a third side opposite a fourth side;
    wherein said first upstanding wall extends along said first side and said second upstanding wall extends along said second side, and wherein said first and second upstanding walls extend partially onto said third side and said fourth side such that said first and second upstanding walls resemble a pair of opposing U-shaped sections;
    wherein said first upstanding wall and said second upstanding wall define respective channels along the third side and the fourth side;
    wherein a plurality of elongated ridges are disposed within said channels on said third side and said fourth side of said upper surface of said rigid base.

2. The tablet computer holding device of claim 1, wherein said top surfaces of said first and second upstanding walls comprise a plurality of elongated ridges thereon.

3. The tablet computer holding device of claim 1, wherein said rigid base comprises one or more apertures therethrough that are adapted to receive a finger or fingers of a user.

4. The tablet computer holding device of claim 1, wherein a bottom surface of said rigid base comprises a plurality of elongated ridges disposed on opposing sides of said rigid base.

5. The tablet computer holding device of claim 1, wherein said fasteners include a first pair of clips positioned on a first side of said rigid base and a second pair of clips positioned on a second side of said rigid base, opposite said first side.

6. The tablet computer holding device of claim 1, wherein said rigid base and said first and second upstanding wall are composed of ABS.

7. The tablet computer holding device of claim 1, wherein said rigid base, said first and second upstanding wall, and said fasteners are of a unitary, integrated construction.

8. The tablet computer holding device of claim 1, wherein the plurality of elongated ridges are concentric about a central point of the base.

9. The tablet computer holding device of claim 1, wherein a bottom surface of said rigid base comprises a plurality of elongated ridges thereon.

10. The tablet computer holding device of claim 9, wherein the bottom surface comprises a groove configured to receive fingers for gripping the base.

11. The tablet computer holding device of claim 1, wherein said fasteners are clips.

12. The tablet computer holding device of claim 11, wherein said clips are flexible and are biased inward toward an opposing side of said rigid base.

13. The tablet computer holding device of claim 11, wherein said clips are formed integrally with said rigid base.

* * * * *